United States Patent
Oriani

(10) Patent No.: US 9,840,614 B2
(45) Date of Patent: *Dec. 12, 2017

(54) HEAT AGING RESISTANT ETHYLENE VINYL ACETATE COPOLYMER COMPOSITION AND PROCESS FOR ITS PRODUCTION

(71) Applicant: E. I. DU PONT DE NEMOURS AND COMPANY, Wilmington, DE (US)

(72) Inventor: Steven R. Oriani, Landenberg, PA (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,581

(22) Filed: Mar. 3, 2016

(65) Prior Publication Data

US 2016/0185944 A1  Jun. 30, 2016

Related U.S. Application Data

(63) Continuation of application No. 14/014,463, filed on Aug. 30, 2013, now abandoned.

(60) Provisional application No. 61/699,971, filed on Sep. 12, 2012.

(51) Int. Cl.
| | |
|---|---|
| *C08L 23/08* | (2006.01) |
| *C08L 31/04* | (2006.01) |
| *C08L 77/00* | (2006.01) |
| *C08L 77/02* | (2006.01) |

(52) U.S. Cl.
CPC ........... *C08L 23/0853* (2013.01); *C08L 31/04* (2013.01); *C08L 77/02* (2013.01); *C08L 2201/08* (2013.01); *C08L 2205/08* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 4,174,358 A | 11/1979 | Epstein | |
| 4,348,502 A * | 9/1982 | Coran | ................ C08L 23/0853 524/87 |
| 5,948,503 A | 9/1999 | Yamamoto et al. | |
| 7,608,216 B2 | 10/2009 | Park et al. | |
| 7,691,943 B2 | 4/2010 | Hoffmann et al. | |
| 9,062,193 B2 * | 6/2015 | Oriani | ................ C08L 23/0853 |
| 9,068,066 B2 * | 6/2015 | Oriani | .................... C08L 23/16 |
| 2006/0100368 A1 | 5/2006 | Park | |
| 2006/0189742 A1 | 8/2006 | Ulrich et al. | |
| 2009/0247690 A1* | 10/2009 | Varnhorn | ................ C08L 31/04 524/507 |

OTHER PUBLICATIONS

Yu et al., "Effect of EVM/EVA-g-MAH Ratio on the Structure and Properties of Nylon 1010 Blends", J. Polymer Science: Part B: Polymer Physics, vol. 47, 877-887 (2009).
PCT International Search Report and Written Opinion for International Application No. PCT/US2013/058160 dated Nov. 19, 2013.

* cited by examiner

*Primary Examiner* — Ana Woodward

(57) ABSTRACT

Polyamide-filled EVA copolymer compositions comprising a continuous EVA copolymer phase and a discontinuous polyamide phase are produced by a melt mixing process. When crosslinked with peroxide curatives the polyamide-filled EVA copolymer compositions exhibit enhanced resistance to heat aging compared to EVA elastomer compositions reinforced with carbon black or other inorganic fillers.

19 Claims, No Drawings

HEAT AGING RESISTANT ETHYLENE VINYL ACETATE COPOLYMER COMPOSITION AND PROCESS FOR ITS PRODUCTION

CROSS REFERENCE TO RELATED APPLICATIONS

This application claims priority under 35 U.S.C. §120 as a continuation of U.S. patent application Ser. No. 14/014,463, filed on Aug. 30, 2013, which in turn claims priority under 35 U.S.C. §119 to U.S. Provisional Application No. 61/699,971, filed on Sep. 12, 2012, the entire disclosure of each of which is incorporated herein by reference.

FIELD OF THE INVENTION

The present invention is directed to an ethylene vinyl acetate copolymer composition, a peroxide curable composition thereof, a process for producing a curable ethylene vinyl acetate elastomer composition having enhanced heat aging performance, and to cured articles from these peroxide curable ethylene vinyl acetate compositions.

BACKGROUND OF THE INVENTION

Oil resistant ethylene vinyl acetate elastomers (EVA) are well-known synthetic materials formed by copolymerizing ethylene and at least 40 wt % vinyl acetate. The ethylene vinyl acetate (EVA) copolymers may contain only copolymerized ethylene units and vinyl acetate units or the copolymers may comprise copolymerized ethylene units, vinyl acetate units, and additional copolymerized monomers, for example esters of unsaturated carboxylic acids, such as methyl acrylate or butyl acrylate. The raw polymers, also known as gums or gum rubbers, may be cured by free radical generators such as peroxides, azides, or by use of high energy radiation to form elastomeric articles. Examples of commercially available EVA copolymers that may be cured to form elastomeric articles include Elvax® resin products from E. I. du Pont de Nemours and Company and Levapren® products from Lanxess Corp.

In view of their low cost compared to other oil resistant elastomers, ethylene vinyl acetate copolymers are widely used in the manufacture of wire and cable jacketing as well as in the production of automotive parts such as hoses and seals.

Resistance to heat aging, meaning extended exposure to hot air, is a particularly desirable property in rubber parts that are used in under the hood automotive applications, e.g. hoses, gaskets, and seals. Because such parts may be exposed to temperatures in excess of 180° C. for periods of several hours on a regular basis, degradation of physical properties through oxidative embrittlement can occur. In articles made from cured ethylene vinyl acetate (EVA) articles, this often results in a reduction in extensibility and an increase in hardness and modulus of the rubber article. Such effects are disclosed for example in Patent Publication EP1081188. Methods to enhance heat aging resistance of elastomeric EVA articles have involved attempts to identify more effective antioxidant systems. However, there is still a need to improve the heat aging resistance of these copolymers.

Although it is known that the presence of fillers can have an adverse effect on high temperature stability of elastomers, the presence of fillers in elastomer formulations (also referred to in the art as elastomer compounds) is generally necessary for reinforcement and development of certain physical properties such as tensile strength and modulus in cured (i.e. crosslinked) compositions and in articles comprising the cured compositions. Carbon black is the most widely used filler due to its excellent reinforcement properties and low cost. Other examples of fillers that are commonly used for reinforcing EVA copolymers include hydrated alumina, calcium carbonate, barium sulfate, titanium dioxide, magnesium silicate, kaolin clay, and silica. All these fillers adversely affect heat aging of cured articles made from EVA copolymers.

It has been postulated that fillers accelerate heat aging of EVA copolymers by facilitating transport of oxygen to the polymer-filler interface. This leads to an increased rate of formation of free radicals at such locations through oxidative reactions. The free radicals generated in this manner promote crosslinking reactions, thereby resulting in eventual embrittlement of the elastomer. Reinforcing grades of carbon black such as N330 and N550 are particularly effective at facilitating transport of oxygen because they contain pores that may transport air. However, even non-porous fillers create interfacial regions between the solid filler particles and the elastomer. Few polymer chains reside in such interfacial regions and consequently diffusion of air may be enhanced. Thus, exposure of the elastomer to air is believed to be greater in filled EVA copolymers compared to EVA copolymers that are free of filler.

As the reinforcing power of a conventional filler increases, i.e., the ability of the filler to increase Shore A hardness of a cured elastomer composition, the tendency of that filler to lower resistance of the elastomer to the deleterious effects of heat aging also increases. It would be desirable to have available an alternative filler that permits the attainment of good elastic properties such as compression set resistance and tensile elongation to break in the cured, filled elastomer and further provides the advantages of filler reinforcement (i.e. high tensile strength, modulus and Shore A hardness), but does not promote oxidative degradation at high temperatures (i.e. 160° C. or greater).

It has now been found that it is possible to produce cured EVA elastomer compositions of high hardness, strength, and elasticity that exhibit excellent heat aging resistance through use of polyamide as a filler.

A number of EVA copolymer-polyamide blend compositions have been disclosed in the prior art. For example, it is known to add uncured EVA copolymers (i.e. gums) to polyamides to form toughened thermoplastic compositions. U.S. Pat. No. 4,174,358 exemplifies the use of uncured EVA copolymers at levels up to 20 wt % as toughening additives for polyamides. A compatibilizer such as a maleic anhydride grafted EVA copolymer may also be included in the EVA copolymer-polyamide blend, as disclosed in *J. Polymer Science: Part B: Polymer Physics*, Vol. 47, 877-887 (2009). The polyamide component in these compositions comprises the continuous polymer matrix and the uncured EVA copolymer is a minor additive. When polyamide comprises the continuous phase in the blend the composition generally cannot be processed at temperatures below the melting temperature of the polyamide, or can be processed only with great difficulty at such temperatures.

It is also known to form thermoplastic elastomer compositions comprising EVA copolymer and polyamide. For example, U.S. Pat. No. 5,948,503 discloses compositions comprising an uncured elastic polymer, a polyamide in the form of fine fibers, and a polyolefin having a melting temperature from 80° C. to 250° C. In addition, certain vulcanized compositions are disclosed therein.

Thermoplastic vulcanizates comprising EVA and polyamide, in which the EVA copolymer is dynamically crosslinked (i.e., crosslinked under shear mixing to create a dispersion of elastomer particles in a continuous phase of another polymer) are also known. Such compositions are disclosed in EP2098566, and may be improved by the use of a coupling agent such as maleic anhydride grafted EVA copolymer as disclosed in U.S. Pat. No. 7,691,943.

U.S. Pat. No. 7,608,216 and U.S. Patent Application Publication 2006/0100368 disclose compositions prepared by admixing an uncured elastomer, for example an EVA copolymer, with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

As disclosed herein, it has now been found that when a dispersion of polyamide particles is used in place of all or a significant portion of a conventional particulate reinforcing agent in a continuous EVA elastomer, the resultant compositions, when cured by a free radical generator, exhibit enhanced resistance to physical property loss during heat aging. In addition, such compositions maintain excellent tensile strength, modulus, hardness, and elastic properties such as compression set and elongation at break that characterize compositions containing conventional reinforcing fillers.

SUMMARY OF THE INVENTION

Disclosed herein is a polymer blend comprising a polyamide-filled EVA copolymer composition, said polyamide-filled EVA copolymer composition consisting essentially of (a) about 40 wt % to about 95 wt % of an EVA copolymer component comprising one or more EVA copolymers wherein the EVA copolymer comprises at least 40% by weight copolymerized vinyl acetate monomer units; and (b) about 5 wt % to about 60 wt % of a polyamide component comprising one or more polyamides having a melting peak temperature of at least 160° C., wherein i) the polyamide-filled EVA copolymer composition has a Mooney viscosity (ML 1+4, 100° C.) determined according to ASTM D1646 of 5 to 200, and ii) the weight percentages of the EVA copolymer and polyamide components are based on the combined weight of the EVA copolymers and polyamides in the polyamide-filled EVA copolymer composition.

Also disclosed herein is a curable polyamide-filled EVA copolymer composition comprising (a) a polyamide-filled EVA copolymer composition comprising: (i) 40 to 95 wt % of an EVA copolymer component comprising one or more EVA copolymers wherein the EVA copolymer comprises at least 40% by weight copolymerized vinyl acetate units; and (ii) 5-60 wt % of a polyamide component comprising one or more polyamides having a melting peak temperature of at least 160° C., wherein i) the polyamide-filled EVA copolymer composition has a Mooney viscosity (ML 1+4, 100° C.) of 5-200, as determined according to ASTM D1646, and ii) the weight percentages of the EVA copolymer and polyamide components are based on the combined weight of the EVA copolymers and polyamides in the polyamide-filled EVA copolymer composition; and (b) a peroxide curative.

Another disclosure herein is a process for production of a polyamide-filled EVA copolymer composition, the process comprising the steps (a) providing one or more EVA copolymers consisting essentially of EVA copolymers comprising at least 40% by weight vinyl acetate monomer, and one or more polyamides having a melting peak temperature of at least 160° C.; (b) mixing the one or more EVA copolymers and the one or more polyamides at a temperature above the melting peak temperatures of the one or more polyamides to disperse the one or more polyamides within the one or more EVA copolymers, the one or more EVA copolymers and one or more polyamides being present in sufficient amounts to form a polyamide-filled EVA copolymer composition comprising 5-60 wt % polyamide based on the total amount of EVA copolymers and polyamides in the blend; and (c) cooling the polyamide-filled EVA copolymer composition to a temperature below the crystallization peak temperatures of the one or more polyamides, thereby forming a polyamide-filled EVA copolymer composition having a Mooney viscosity (ML 1+4, 100° C.) of 5 to 200, as determined according to ASTM D1646, wherein one may, or may not, also add a peroxide curative to the polyamide-filled EVA copolymer composition after said copolymer composition has been cooled below the crystallization peak temperatures of the one or more polyamides, the addition taking place at a temperature of less than 160° C.

Yet another disclosure herein is a process for preparing an EVA elastomer composition comprising the steps of: (a) providing a polyamide-filled EVA copolymer composition that has been prepared by a process comprising the steps: (i) providing i) one or more EVA copolymers comprising at least 40% by weight copolymerized vinyl acetate monomer units, and ii) one or more polyamides having a melting peak temperature of at least 160° C.; (ii) mixing the one or more EVA copolymers and one or more polyamides at a temperature above the melting peak temperatures of the one or more polyamides to disperse the one or more polyamides within the one or more EVA copolymers, the one or more EVA copolymers and one or more polyamides being present in sufficient amounts to form a polyamide-filled EVA copolymer composition comprising 5-60 wt % of one or more polyamides based on the total weight of EVA copolymers and polyamides in the polyamide-filled EVA copolymer composition; and (iii) cooling the polyamide-filled EVA copolymer composition to a temperature below the crystallization peak temperatures of the one or more polyamides, thereby forming a polyamide-filled EVA copolymer composition that has a Mooney viscosity (ML 1+4, 100° C.) of 5 to 200, as determined according to ASTM D1646; (b) adding a peroxide curative to the cooled polyamide-filled EVA copolymer composition at a temperature less than 160° C. to form a curable polyamide-filled EVA copolymer composition; and (c) curing the curable polyamide-filled EVA copolymer composition by exposing the curable polyamide-filled EVA copolymer composition to a temperature of about 160° C. to about 220° C. for about 2 to 60 minutes to form an EVA elastomer composition having a Shore A hardness greater than 40, as determined according to ASTM D 2240-06, reading after 1 second.

Also disclosed herein is a curable EVA copolymer composition comprising: (a) a polymer blend composition comprising (i) 40 to 95 wt % of an EVA copolymer component comprising one or more EVA copolymers comprising at least 40% by weight copolymerized vinyl acetate monomer units; and (ii) 5-60 wt % of a polyamide component comprising one or more polyamides having a melting peak temperature of at least 160° C., wherein the polymer blend has a Mooney viscosity (ML 1+4, 100° C.) of 5 to 200, as determined according to ASTM D1646, and the weight percentages of the EVA copolymer and polyamide components are based on the combined weight of the EVA copolymers and polyamides in the blend composition; (b) a peroxide curative; and (c) a reinforcing filler, the reinforcing filler being present in the curable EVA copolymer composition in an amount that causes an increase in the Shore A hardness of the cured EVA copolymer composition of no more than about 20 points as compared to the Shore A hardness of a control composition that is of identical composition but for the absence of the reinforcing filler, wherein i) the curable EVA copolymer composition and control composition are formed into test specimens of 1 mm to 2.5 mm thickness, the test specimens are cured by exposure to a temperature of 175° C. for 10 minutes in a closed mold at a pressure of at least 10 MPa, then removed from the mold and post cured in a hot air oven at a temperature of 175° C. for 30 minutes, ii) Shore A hardness of the post cured EVA copolymer composition and the post cured control composition is determined according to ASTM D 2240-06 (1 second reading), and iii) the cured EVA copolymer composition has a Shore A hardness greater than 40.

DETAILED DESCRIPTION OF THE INVENTION

The present invention is directed to compositions comprising blends of EVA (ethylene vinyl acetate) copolymers and polyamides that, when cured with a free radical source such as a peroxide curative system, exhibit enhanced resistance to physical property loss during heat aging, or hot air aging. The invention is also directed to a process for preparation of EVA copolymer/polyamide blend compositions, a process for preparation of curable EVA copolymer/polyamide blend compositions and a process for preparation of cured articles from the curable EVA copolymer/polyamide blend compositions.

It has been found that when polyamide particles are primarily used instead of conventional reinforcing fillers such as carbon black and inorganic fillers in curable EVA copolymers, (also known as EVM rubbers) such that the EVA copolymer forms a continuous phase and the polyamide forms a discontinuous phase, the resultant compositions, when cured, exhibit surprising improvements in physical properties. That is, the curing process, which is also commonly referred to as crosslinking or vulcanization, converts the polyamide-filled EVA copolymer composition to an EVA elastomer composition that exhibits enhanced heat aging resistance compared to EVA elastomer compositions that rely solely on carbon black or inorganic reinforcing fillers. Depending on the vinyl acetate content, the EVA copolymer may be amorphous or may exhibit a melting peak temperature up to about 50° C. The term "reinforcement" refers to an increase in the hardness and tensile strength of the cured (i.e. crosslinked) composition relative to the similarly crosslinked but unfilled EVA elastomer. In particular, a crosslinked EVA elastomer composition having a Shore A hardness (ASTM D2240-06, 1 second reading) of 40 or less is too soft for the majority of EVA elastomer applications, and therefore may be considered insufficiently reinforced. A crosslinked EVA elastomer composition having a tensile strength of less than 4 MPa (ASTM D412-06, die C) is too weak for the majority of EVA elastomer applications, and also may be considered to be insufficiently reinforced.

One embodiment of the invention is a curable EVA copolymer composition that comprises a polymer blend composition and a curative, usually a peroxide curative. The polymer blend composition is characterized by having a Mooney viscosity of 5 to 200 as determined in accordance with ASTM D1646, ML 1+4, 100° C.

The polymer blend composition comprises, or in some embodiments consists essentially of two polymer components, an EVA copolymer component and a polyamide component, and is referred to herein as a polyamide-filled EVA copolymer composition. The EVA copolymer component of the blend comprises one or more EVA copolymers, each comprising at least 40 wt % vinyl acetate copolymerized units.

As used herein, the term "consisting essentially" means with respect to the polymer blend composition described herein, that no more than 30 parts by weight of a polyolefin having a melting peak temperature greater than 80° C. is present per hundred parts by weight of the EVA copolymer, and the polymer blend composition is characterized by having a Mooney viscosity, as determined according to ASTM D1646, ML 1+4, 100° C., of 5 to 200. When more than 30 parts by weight of such high melting point polyolefin is present in the polymer blend composition, the polymer blend composition can be difficult to process into a curable composition, and if successfully processed, it may have poor elasticity and a Shore A hardness greater than 80.

The EVA copolymers useful in the practice of the invention described herein comprise copolymerized units of ethylene and vinyl acetate monomers. Other monomers may optionally be present, including alkyl esters or alkoxyalkyl esters of propenoic acid, carbon monoxide, alpha-olefins such as propene, 1-butene, 1-hexene, and the like, or comonomers that provide epoxide, anhydride, or acid functionality in the EVA polymer, for example glycidyl methacrylate, maleic anhydride and its half esters, or (meth) acrylic acid.

The concentration of vinyl acetate comonomer present in these EVA copolymers will be at least 40 weight percent, based on the weight of the ethylene and vinyl acetate comonomer units in the copolymer. Preferably, the vinyl acetate comonomer concentration in the EVA copolymer will be at least 45 weight percent, and more preferably at least 50 weight percent. If the concentration of vinyl acetate is below 40 wt %, the EVA copolymer will lack elastic properties. In addition, a high content of non-polar comonomer, such as ethylene, diminishes compatibility of the EVA copolymer with polyamide, and therefore physical properties of the cured composition, such as tensile and tear strength, may be adversely affected.

Examples of EVA copolymers include Elvax® 40L03 resin, available from E. I. du Pont de Nemours and Company and Levapren® grades 400 through 900, available from Lanxess Corp.

The EVA copolymers that are used to prepare the curable polyamide-filled EVA copolymer compositions of the invention are curable gums, i.e. they are substantially uncured rubbers. By substantially uncured is meant that the unblended EVA copolymer has a sufficiently low viscosity to be shaped into a finished article by molding or extrusion. Preferably, the Mooney viscosity (ASTM D1646, ML 1+4 at 100° C.) of the EVA copolymer is less than 120, more preferably less than 80 and most preferably less than 40. By retaining reactivity towards crosslinking is meant that the curable composition intended for production of a molded or extruded article (i.e. the composition that includes EVA elastomer, polyamide, curative and optionally conventional filler) exhibits an increase in torque (MH-ML) when tested in a rotorless cure meter per ASTM D5289-07a at conditions of 177° C. for 24 minutes of at least 2.5 dN-m, more preferably at least 4 dN-m, and most preferably more than 5.5 dN-m. In some embodiments, the EVA copolymers are amorphous polymers, rather than semi-crystalline thermoplastics. That is, the heat of fusion of the EVA copolymer will generally be less than 4 J/g as measured by ASTM D3418-08, preferably less than 2 J/g, and most preferably about 0 J/g.

The polyamide-filled EVA copolymer compositions described herein comprise one or more polyamides having a melting peak temperature of at least about 160° C., preferably less than 270° C. as determined in accordance with ASTM D3418-08. Preferably the polyamide is solid at the curing temperature of the EVA copolymer, meaning that the curing temperature is less than the melting peak temperature of the polyamide. Most preferably, the polyamide component has a melting peak temperature from about 180° C. to 260° C. While not wishing to be bound by theory, when the polyamide is not solid at the curing temperature, curative readily diffuses into the polyamide, rendering the blend difficult to cure. Polyamide resins are well known in the art and embrace those semi-crystalline resins having a weight average molecular weight of at least 5,000 and include those compositions commonly referred to as nylons. Thus, the polyamide component useful in the practice of the invention includes polyamides and polyamide resins such as nylon 6, nylon 7, nylon 6/6, nylon 6/10, nylon 6/12, nylon 11, nylon 12, polyamides comprising aromatic monomers, and polyamide block elastomers such as copoly(amide-ether) or copoly(amide-ester). The resins may be in any physical form, such as pellets and particles of any shape or size, including nanoparticles.

The viscosity of the polyamide resins can vary widely while meeting the objective of the present invention. To ensure that the polyamide becomes dispersed within a continuous phase of EVA copolymer, it is desirable that the polyamide have an inherent viscosity greater than 0.9 dL/g, more preferably greater than 1.1 dL/g, and most preferably greater than 1.3 dL/g, as measured in accordance with ASTM D2857-95, using 96% by weight sulfuric acid as a solvent at a test temperature of 25° C. In general, as the concentration of the polyamide in the EVA elastomer blend increases, the use of a polyamide of higher inherent viscosity becomes more desirable.

The polyamide resins described herein are readily available commercially. They can also be produced by condensation polymerization of equimolar amounts of a saturated dicarboxylic acid containing from 4 to 12 carbon atoms with a diamine, which diamine contains from 4 to 14 carbon atoms. The polyamide may also be prepared by a ring opening polymerization reaction such as nylon 6, or by condensation of aminocarboxylic acids such as nylon 7 or 11.

Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauriclactam, poly-11-aminoundecanoic acid, and bis(p-aminocyclohexyl)methanedodecanoamide. It is also possible to use polyamides prepared by the polymerization of two of the above polymers or terpolymerization of the above polymers or their components, e.g. an adipic acid isophthalic acid hexamethylene diamine elastomer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to elastomers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Block copoly(amide) elastomers are also suitable for use as the polyamide component provided the melting peak temperature of the polyamide block is at least 160° C. If a low softening point material comprises the block copoly (amide) elastomer, e.g., a polyether oligomer or a polyalkylene ether, for example, poly(ethylene oxide), then the block polymer will be a copoly(amide-ether). If a low softening point material of the block copoly(amide) elastomer comprises an ester, for example, a polylactone such as polycaprolactone, then the block elastomer will be a copoly (amide-ester). Any such low softening point materials may be used to form a block copoly(amide) elastomer. Optionally, the lower softening point material of the block copoly (amide) elastomer may comprise a mixture, for example, a mixture of any of the above-mentioned lower softening point materials. Furthermore, said mixtures of lower softening point materials may be present in a random or block arrangement, or as mixtures thereof. Preferably, the block copoly(amide) elastomer is a block copoly(amide-ester), a block copoly(amide-ether), or mixtures thereof. More preferably, the block copoly(amide) elastomer is at least one block copoly(amide-ether) or mixtures thereof. Suitable commercially available thermoplastic copoly(amide-ethers) include PEBAX® polyether block amides from Elf-Atochem, which includes PEBAX® 4033 and 6333. Most preferably, the polyamide is other than a block copoly (amide-ether) or copoly(amide-ester). Other polyamides have generally higher melting peak temperatures and are more effective in reinforcing the EVA copolymer. Poly (amide-ethers) also exhibit poorer heat aging as compared to conventional polyamides lacking a polyether block.

Preferred polyamides are homopolymers or copolymers wherein the term copolymer refers to polyamides that have two or more amide and/or diamide molecular repeat units.

The polyamide component may comprise one or more polyamides selected from Group (I) polyamides having a melting peak temperature of at least about 160° C., but less than about 210° C., and comprising an aliphatic or semiaromatic polyamide, for example poly(pentamethylene decanediamide), poly(pentamethylene dodecanediamide), poly(ε-caprolactam/hexamethylene hexanediamide), poly(ε-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting peak temperature of at least about 210° C., and comprising an aliphatic polyamide selected from the group consisting of poly(tetramethylene hexanediamide), poly(ε-caprolactam), poly(hexamethylene hexanediamide), poly(hexamethylene dodecanediamide), and poly(hexamethylene tetradecanediamide); Group (III) polyamides having a melting peak temperature of at least about 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising from about 50 to about 95 mole percent semi-aromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting peak temperature of at least about 260° C., comprising greater than 95 mole percent semi-aromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms. The one or more polyamides used herein may also be a blend of two or more polyamides.

Preferred polyamides include nylon 6, 6/10, 10/10, 11, 6/12, 12, 6/6, and Group IV polyamides having a melting peak temperature less than about 270° C. These polyamides have a melting peak temperature sufficiently high so as not to limit the scope of applications for the curable polyamide-filled EVA copolymers, but not so high that production of the blends causes significant degradation of the EVA copolymer.

Polyamides suitable for use in the invention are widely commercially available, for example Zytel® resins, available from E. I. du Pont de Nemours and Company, Wilmington, Del., USA, Durethan® resins, available from Lanxess, Germany, and Ultramid® resins available from BASF, USA.

Preferably, the polyamide component of the polyamide-filled EVA copolymer compositions is present in the EVA copolymer in the form of approximately spherical particles, i.e., the aspect ratio of the particles is less than 10 to 1. When the aspect ratio exceeds about 10 to 1, the viscosity of the blend is increased and molding or extruding the blend at a temperature less than the melting peak temperature of the polyamide component becomes difficult. The size of the polyamide particles is relatively unimportant, though tensile strength of the cured composition becomes optimal when most of the particles are about 2 micrometers in diameter or smaller. Such compositions can be mixed, molded and/or extruded using conventional techniques to produce curable compositions that may be crosslinked with conventional curative systems to form a wide variety of elastomer articles.

The curable polyamide-filled EVA copolymer compositions of the invention comprise from about 40 to about 95 weight percent of the EVA copolymer component described herein and from about 5 to about 60 weight percent of the polyamide component described herein, based on the total weight of the EVA copolymer and polyamide components. The EVA copolymer component may be made up of one or more than one EVA copolymer of the type described herein as being suitable for use in the practice of the invention. Similarly, the polyamide component may be made up of one or more than one polyamide of the type described herein as being suitable for use in the practice of the invention. Preferably, the curable compositions will comprise from about 60 to about 90 weight percent EVA copolymer component and from about 10 to about 40 weight percent polyamide component, based on the total weight of the EVA copolymer and polyamide components. More preferably, the curable compositions will comprise from about 55 to about 70 weight percent EVA copolymer component and from about 30 to about 45 weight percent polyamide component based on the total weight of the EVA copolymer and polyamide components. These ratios provide a polyamide-filled EVA copolymer composition such that a cured article made therefrom exhibits sufficient Shore A hardness so that little or no reinforcing filler is needed to further increase the hardness of the cured composition. Preferably, the cured composition exhibits a Shore A hardness of about 80 or less. In addition, the polymer blends exhibit Mooney viscosities (ML 1+4, 100° C.), as determined according to ASTM D1646, of 5 to 200, preferably 10 to 150, and most preferably 20 to 100.

The curable polyamide-filled EVA copolymer compositions may be formed by mixing the polyamide component into the EVA copolymer component at temperatures above the melting peak temperature of the polyamide, under conditions that do not produce a dynamic cure of the EVA copolymer, followed by cooling the thus-produced polymer blend to form a polyamide-filled EVA copolymer composition. By dynamic cure is meant mixing EVA copolymer and polyamide in the presence of a curative while simultaneously expending, decomposing, or consuming the curative. Because a dynamic cure leaves little or no longer active curative remaining after the mixing process, the resulting composition will not exhibit an acceptable cure response as measured per ASTM D5289-07a using an MDR 2000 from Alpha Technologies operating at 0.5° arc and at test conditions of 177° C. for 24 minutes. That is, a curative, generally a peroxide curative, will not be present when the polyamide component and EVA copolymer components are being mixed. This is because the mixing temperature specified (above the melting peak temperature of the one or more polyamides) is above that at which crosslinking and/or gelling of the EVA copolymer will occur in the presence of a peroxide. Gelling or crosslinking of the EVA copolymer during mixing with molten polyamide forces the polyamide to become the continuous phase in the blend, so that after the blend has cooled and the polyamide has solidified, the blend becomes difficult or impossible to further process at a temperature less than the melting peak temperature of the polyamide component. In particular, a polymer blend with a continuous polyamide phase may exhibit a Mooney viscosity (ML 1+4, 100° C.) greater than 200, or it may exhibit flow behavior such that the Mooney viscosity cannot be measured. Inability to measure a Mooney viscosity of the blend occurs either because the blend cannot be formed into the Mooney test specimen by conventional rubber processing techniques at a temperature less than the melting peak temperature of the polyamide, or because the test specimen crumbles during the Mooney test.

Cooling of the polymer blend formed by mixing the EVA copolymer component and polyamide component serves to crystallize the polyamide domains so that the polyamide becomes solid and therefore cannot coalesce to form a continuous phase upon subsequent mixing, e.g., when mixed with an peroxide curative to form a curable composition. The temperature below which the blend must be cooled can be determined by measuring the crystallization peak temperature according to ASTM D3418-08. The polyamide-filled EVA copolymer compositions may exhibit multiple crystallization peak temperatures. In such cases, the lowest crystallization peak temperature is taken as the temperature below which the blend must be cooled to fully solidify the polyamide component. Generally, the blend will be cooled to 40° C. or less, which is sufficient to solidify the polyamides useful in the practice of the present invention.

The curable polyamide-filled EVA copolymer compositions described herein also comprise a peroxide curative. Suitable peroxide curatives, also known as peroxide curing systems, comprise a peroxide and optionally a coagent. Examples of peroxides and coagents include curative systems as generally known in the art, including those described herein, operative at the temperature employed during vulcanization. For example, useful organic peroxides are those that decompose rapidly within the temperature range of 150° C. to 220° C. These include, for example, dicumyl peroxide, 2,5-bis(t-butylperoxy)-2,5-dimethylhexane, and α',α'-bis(t-butylperoxy)-diisopropylbenzene (available from Arkema Inc., USA under the tradename Vul-Cup® peroxide). In a typical vulcanizate composition the peroxide is present in amounts of from about 0.5 to 5 parts phr (parts per hundred parts rubber, i.e. parts per hundred parts of the one or more EVA polymers present). The peroxide may be adsorbed on an inert carrier such as calcium carbonate, carbon black or kieselguhr. It is noted that the weight of the carrier is not included in the above range weight limits. Generally, an optional coagent will be present to increase the state of cure of a finished part. The coagent can be for example, N,N'-(m-phenylene) dimaleimide, trimethylolpropane trimethylacrylate, tetraallyloxyethane, triallyl cyanurate, tetramethylene diacrylate, or polyethylene oxide glycol dimethacrylate. A preferred coagent is N,N'-(m-phenylene) dimaleimide, available from E. I. du Pont de Nemours and Company, Wilmington, Del., USA as HVA-2. The amount of the coagent used is generally about 0 to about 5 parts by weight per 100 parts EVA polymer (phr), preferably from about 1 to about 5 parts phr. The coagents usually contain multiple unsaturated groups such as allyl groups or acrylic ester groups.

The addition of curative to the polyimide-filled EVA copolymer composition will desirably take place at a temperature below the decomposition temperature of the peroxide and below the temperature at which the crosslinking reaction occurs. Generally, the addition will take place at a temperature below 160° C., preferably at a temperature below 140° C., and most preferably at a temperature no greater than 120° C. The addition of the curative may take place simultaneously with the addition of optional processing ingredients, such as colorants, conventional carbon black or mineral reinforcing agents, antioxidants, processing aids, fillers and plasticizers, or it may be an operation separate from addition of the other ingredients. The addition may be conducted on a two-roll rubber mill or by using internal mixers suitable for compounding gum rubber compositions, including Banbury® internal mixers, Haake Rheocord® mixers, Brabender Plastograph® mixers, Farrel Continuous Mixers, or single and twin screw extruders.

After addition of the curatives and other optional ingredients such as fillers, plasticizers, pigments, antioxidants, process aids, etc., to the polyimide-filled EVA composition, the resulting compound desirably exhibits a strong cure response as determined in accordance with ASTM D5289-07a using an MDR 2000 from Alpha Technologies operating at 0.5° arc and at test conditions of 177° C. for 24 minutes. Preferably, the increase in torque measured in this test is at least 2.5 dN-m, more preferably at least 4 dN-m, and most preferably at least 5.5 dN-m. The increase in torque is the difference MH-ML, where ML refers to the minimum torque value measured and MH refers to the maximum torque value attained after the measurement of ML.

To achieve optimal heat aging resistance, an antioxidant is desirably added to the curable EVA copolymer composition prior to curing. Useful antioxidants include, but are not limited to, aryl amines, phenolics, imidazoles, and phosphites. Thus, in some embodiments, the antioxidant will be a phosphorus ester antioxidant, a hindered phenolic antioxidant, an amine antioxidant, or a mixture of two or more of these compounds. The proportion of the antioxidant compound in the composition is typically 0.1 to 5 phr, preferably about 0.5 to 2.5 phr. The weight ratio of the phenolic or amine antioxidant to the phosphorus compound in the mixtures is about 0.5 to 3, and preferably the ratio is about 1.

Examples of aryl amines that may be useful antioxidants include 4,4'-bis(α,α-dimethylbenzyl)diphenylamine, diphenylamine and alkylated diphenylamines, 4-aminodiphenyl amine, and N-phenyl-N'-(p-toluenesulfonyl)-p-phenylenediamine. Examples of phenolic antioxidants include 4,4'-butylenebis(6-t-butyl-m-cresol), 1,3,5-trimethyl-2,4,6-tris-(3,5-di-t-butyl-4-hydroxybenzyl)benzene, and 4,4'-thiobis-(3-methyl-6-t-butylphenol). Examples of phosphite antioxidants include triphenylphosphite, bis(2,4-di-t-butylphenyl)pentraerythritol diphosphite, and tris(2,4-ditert-butylphenyl)phosphite. Examples of imidazole antioxidants include 2-mercaptomethylbenzimidazole, 2-mercaptobenzimidazole, and zinc 4- and -5-methyl-2-mercapto-benzimidazole. Combinations of antioxidants may be used, generally at levels between 0.5 and 5 phr based on 100 parts of the EVA copolymer in the compound.

Suitable hindered phenolic antioxidants can be, for example 4,4'-butylidenebis(6-t-butyl-m-cresol), 1,3,5-trimethyl-2,4,6-tris-(3,5-di-t butyl-4-hydroxybenzyl)benzene, 2,6-di-t-butyl-α-dimethylamino-p-cresol and 4,4'-thiobis-(3-methyl-6-t-butylphenol).

Antioxidants comprising the salt of a strong base and a weak acid, optionally combined with a carbodiimide, as disclosed in EP1081188, may also be used in the polyamide-filled EVA compositions.

Preferred antioxidant compositions contain tri(mixed mono- and dinonylphenyl) phosphate mixed with either 4,4'-butylidenebis(6-t-butyl-m cresol) or 4,4'-bis($\alpha,\alpha$-dimethylbenzyl)diphenylamine. Preferred antioxidant compositions contain 4,4'-bis($\alpha,\alpha$-dimethylbenzyl)diphenylamine (available commercially as Naugard® 445 from Chemtura Corp.). Antioxidants may be added while the EVA copolymer is melt mixed with the polyamide, or after the blend has cooled.

The polymer blend may also comprise additional polymers provided that when addition of such polymers occurs at a temperature above the melting peak temperature of the polyamide the presence of such polymers does not increase the Mooney viscosity (ML 1+4, 100° C.), as determined according to ASTM D1646, of the resulting composition to above 200. Ethylene copolymers comprising copolymerized or grafted amine or acid reactive functionality may be useful in improving properties such as tensile strength and elongation of the polyamide-filled EVA copolymer compositions. Examples are ethylene copolymers of propylene, 1-butene, 1-hexene, 1-octene, vinyl acetate, methylacrylate, ethylacrylate, or butylacrylate that have been grafted with maleic anhydride or glycidylmethacrylate. Such polymers are available from E. I. du Pont de Nemours and Company as Fusabond® C250 or N493 resins. Additional examples are ethylene copolymers comprising copolymerized units of maleic or fumaric acid, or their half esters or diesters and ethylene (meth)acrylate elastomers. Such polymers are available from E.I. du Pont de Nemours and Company as Vamac® ethylene acrylic elastomer. To be effective, the amine or acid reactive ethylene copolymer must be present in the blend when the polyamide is molten.

In other embodiments, the polymer blend compositions of the invention may be blended with an additional polymer, e.g. an elastomer to dilute the polyamide content of the inventive composition by any mixing process, either above or below the melting peak temperature of the polyamide, providing the presence of the additional polymer does not increase the Mooney viscosity (ML 1+4, 100° C.) of the resulting composition to above 200. The additional polymer used for the blending process may alternatively be an EVA copolymer having the same or different composition from that of the EVA copolymer comprising a composition of the invention, and may further comprise fillers, curatives, or other ingredients. Preferably, such dilution occurs at a temperature below that of the melting peak temperature of the polyamide, and if a curative is present, below the temperature needed to initiate curing.

In addition, the curable EVA copolymer compositions may optionally comprise additional components including plasticizers, process aids, waxes, pigments, and colorants. Such optional components will generally be present in amounts of from about 0.1 phr to about 30 phr, based on the weight of the EVA rubber. The addition of such optional components may take place during preparation of the polymer blend or at the time of mixing of curative and copolymer blend.

In general, compositions that result from mixing EVA copolymers and polyamides may comprise a wide range of blend morphologies, ranging from those wherein discrete, discontinuous polyamide particles exist within a continuous EVA copolymer matrix, to compositions wherein high aspect ratio polyamide "fibers" are present, to compositions that comprise co-continuous structures, to compositions comprising discrete EVA copolymer domains within a continuous phase of polyamide. Most of these compositions have morphologies that are unsuitable for use in the present invention, because the blends have very high Mooney viscosities, i.e. Mooney viscosity ML 1+4, 100° C. of greater than about 200, or exhibit such poor processability at temperatures less than the melting peak temperature of the polyamide that the Mooney viscosity cannot be measured. A Mooney viscosity greater than 200, or the inability to measure Mooney viscosity, indicates that the polyamide comprises a continuous or fibrous phase in the blend. Such blends exhibit poor processability for extrusion or molding, and poor elastic properties after curing if a cured article can successfully be formed. A Mooney viscosity less than 200, preferably less than 150, and most preferably less than 100, is confirmatory of blend morphology wherein the EVA copolymer comprises a continuous phase, and the polyamide comprises a discontinuous phase. By "discontinuous polyamide phase" is meant that the polyamide is present in the polymer blend compositions of the invention as dispersed particles, or domains surrounded by a continuous EVA copolymer matrix. In general, the polyamide domains in the polyamide-filled EVA copolymer compositions of the invention will preferably be completely isolated from each other within the continuous EVA copolymer matrix. However, in certain instances a small percentage, less than about 5%, of localized sites in the polymer blend composition may exist wherein the polyamide domains are aggregated or connected to each other.

In another embodiment, the invention is directed to a polymer blend composition comprising a polyamide-filled EVA copolymer composition. The polyamide-filled EVA copolymer composition consists essentially of one or more EVA copolymers comprising at least 40% by weight vinyl acetate and one or more polyamides having a melting peak temperature of at least about 160° C. as determined in accordance with ASTM D3418-08, the polyamide-filled EVA copolymer composition further characterized by a Mooney viscosity (ML 1+4, 100° C.) of less than 200.

In another embodiment, the invention is directed to a process for production of an EVA copolymer composition to which a peroxide curative may subsequently be added to provide a curable polyamide-filled EVA copolymer composition. The process comprises a first step of providing one or more EVA copolymers comprising at least 40% by weight vinyl acetate and providing one or more polyamides having a melting peak temperature of at least about 160° C. as determined in accordance with ASTM D3418-08. In a second step appropriate amounts of the one or more EVA copolymers and one or more polyamides are mixed at a temperature above the melting peak temperature of the polyamide(s), to form a polyamide-filled EVA composition consisting essentially of 40-95 wt % EVA copolymer and 5-60 wt % polyamide, wherein the weight percentages of EVA copolymer and polyamide are based on the total weight of these components. After being cooled to a temperature less than the crystallization peak temperature of the polyamide, the resultant polyamide-filled EVA copolymer composition has a Mooney viscosity (ML 1+4, 100° C.) less than 200. Cooling will generally preferably be to a temperature of less than 40° C. Addition of a peroxide curative to the polyamide-filled EVA composition at a mixing temperature below about 160° C. provides a curable composition.

Curing or crosslinking (also referred to as vulcanization) of the curable polyamide-filled EVA copolymer compositions of the invention typically involves exposing the curable composition, containing any optional ingredients (i.e. a second curable compound) to elevated temperature and elevated pressure for a time sufficient to crosslink the EVA copolymer. Such operations generally are conducted by placing the curable polyamide-filled EVA copolymer composition into a mold that is heated in a press (often referred to as press-curing). Alternatively, the curable compositions may be extruded into various shapes. Such extruded shapes or parts are often cured in a pressurized autoclave. After the press cure or autoclave cycle is completed, this initial cure may be followed by an optional post-cure heating cycle at ambient pressure to further cure the EVA copolymer. For example, the vulcanizate may be formed and cured using conventional press cure procedures at about 160° C. to about 220° C. for about 2 to 60 minutes. Post-cure heating may be conducted at about 160° C. to about 200° C. for one to several hours. Once crosslinked, the compositions described herein are not thermoplastic, but thermoset. Suitable cure conditions will depend on the particular curable compound formulation and are known to those of skill in the art.

A further embodiment of the present invention relates to curable EVA copolymers that include conventional reinforcing fillers in addition to polyamide filler. Such reinforcing fillers are known to those skilled in the art, and include carbon black, precipitated and fumed silica, crystalline silica such as diatomaceous earth, clays such as kaolin, bentonite, laponite, and montmorillonite, silicate minerals such as magnesium silicate, as well as titanium dioxide, wollastonite, antimony oxide, hydrated alumina, calcium carbonate, barium sulfate, and mixtures of these fillers. The fillers optionally may be modified using organic compounds by known methods to improve either the filler dispersion in the EVA copolymer or the adhesion to the EVA copolymer. Such methods include treating the filler with organo-silanes or quaternary ammonium compounds. Conventional reinforcing fillers are most preferably added after production of the polyamide-filled EVA copolymer composition, at a mixing temperature less than the melting peak temperature of the polyamide. This process ensures that the filler resides in the EVA copolymer phase.

As has been described herein, it is a basic characteristic of the polymer blend of the present invention that they have enhanced heat aging resistance compared to similar compositions wherein only conventional reinforcing fillers are present. Although the presence of reinforcing fillers is generally detrimental to heat resistance, it has been found that in certain instances cured EVA copolymers having good heat resistance can be formed when particular blends of polyamide filler and one or more reinforcing fillers is present. Such reinforced compositions comprise a) a polyamide-filled EVA copolymer having a Mooney viscosity (ML 1+4, 100° C.) from about 5 to 200 and i) about 40 to about 95 wt % of one or more EVA copolymers as described herein and ii) about 5 to 60 wt % of one or more polyamides having a melting peak temperature at least 160° C., the weight percentages being based on the total weight of EVA copolymer and polyamide, b) a peroxide curative, and c) a reinforcing filler. The amount of reinforcing filler present is an amount which does not result in an excessive increase in Shore A hardness of the cured polyamide-filled EVA copolymer composition. The appropriate amount of reinforcing filler may be easily determined by the following method. Two curable EVA copolymer compounds are prepared, differing only in the absence or presence of non-polyamide reinforcing filler. One compound comprises no reinforcing filler, while the other comprises a quantity of reinforcing filler or fillers. The two compounds are cured by exposure to a temperature of 175° C. for 10 minutes in a closed mold at a pressure of at least 10 MPa to form test specimens of thickness 1 to 2.5 mm, followed by a post cure in a hot air for 30 minutes at 175° C. Shore A hardnesses of the molded and post cured samples are determined at a test temperature of 21° to 25° C. according to ASTM D 2240-06 (1 second reading). Subtracting the Shore A hardness of the sample without reinforcing filler from that of the sample containing reinforcing filler reveals the Shore A hardness increase attributable to the filler content of the filled sample. Curable compounds comprising polyamide-filled EVA copolymers wherein any non-polyamide reinforcing filler content present results in an increase in the Shore A hardness of no more than about 20 points as determined by the previously described method will have the heat resistance that is characteristic of the compositions of the invention.

The vulcanizates prepared from the polyamide-filled EVA copolymer compositions described herein exhibit preferable and unusually good resistance to embrittlement during heat aging, as evidenced by a reduction in the amount of decrease in tensile elongation at break following heat aging at 190° C. for one week and a reduction in the increase in Shore A hardness as a result of heat aging. For example, replacement of carbon black with polyamide can decrease the percentage loss of tensile elongation after heat aging for one week at 190° C. by over 50%, and limit the change in Shore A from about 20 points to 4. This degree of improvement is unusual. Furthermore, these advantages in heat aging are gained with no sacrifice in compression set resistance.

Vulcanizates of the polyamide-filled EVA copolymer compositions prepared by the processes described herein can be used in a wide variety of industrial applications, for production of articles including wire and cable jacketing, spark plug boots, hoses, belts, miscellaneous molded boots, seals and gaskets. Hose applications include turbocharger hoses, transmission oil cooler hoses, power steering hoses, air conditioning hoses, air ducts, fuel line covers, and vent hoses.

Examples of seals include engine head cover gaskets, oil pan gaskets, oil seals, lip seal packings, O-rings, transmission seal gaskets, seal gaskets for a crankshaft or a camshaft, valve stem seals, power steering seals, and belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials
EVA Copolymers
A1 Copolymer of ethylene and 45 wt % vinyl acetate, Mooney viscosity (ML 1+4) at 100° C. of 19, available from Lanxess Corp. as Levapren® 450 resin.
A2 Copolymer of ethylene and 50 wt % vinyl acetate, Mooney viscosity (ML 1+4) at 100° C. of 25, available from Lanxess Corp. as Levapren® 500 resin.
A3 Copolymer of ethylene and 40 wt % vinyl acetate, Mooney viscosity (ML 1+4) at 100° C. of 17, available from E.I. du Pont de Nemours and Company, Wilmington, Del. (DuPont Co.) as Elvax® 40L03 resin.

Polyamides

P1 Polyamide 6, inherent viscosity 1.450 dL/g, melting peak temperature 220° C., available from BASF as Ultramid® B40.

P2 Polyamide 6, inherent viscosity of 0.867 dL/g, melting peak temperature of 220° C., available from BASF as Ultramid® B24.

P3 Polyamide copolymer comprising copolymerized units of hexamethylene diamine, adipic acid, and terephthalic acid, with an inherent viscosity of 0.892 dL/g and a melting peak temperature of 262° C.

P4 Polyamide 6/10, having an inherent viscosity of 1.167 dL/g and melting peak temperature of 225° C., available from E.I. DuPont de Nemours and Company.

Compatibilizers

C1 Vamac® Ultra HT elastomer, available from E.I. DuPont de Nemours and Company, Wilmington, Del. (DuPont Co.).

C2 Fusabond® C250 compatibilizer, available from E.I. DuPont de Nemours and Company Wilmington, Del. (DuPont Co.).

Other Ingredients

Peroxide: mixture of the para and meta isomers of an α,α'-bis(tert-butylperoxy)-diisopropylbenzene, 40% peroxide active ingredient on kaolin clay carrier, Vul-Cup® 40KE, available from Arkema Inc.

Coagent: N,N'-(m-phenylene)dimaleimide, HVA-2, available from E.I. DuPont de Nemours and Company Wilmington, Del.

Carbon black: N550 grade, Sterling® SO carbon black, available from Cabot Corp.

Silica: available from Evonik Corp. as Ultrasil® VN3,

Antioxidant (AO): Naugard® 445 antioxidant, available from Chemtura Corp.

Test Methods

Mooney viscosity: ASTM D1646, ML 1+4, 100° C.

Cure response: Measured per ASTM D5289-07a using an MDR 2000 from Alpha Technologies operating at 0.5° arc. Test conditions of 177° C. for 24 minutes. ML refers to the minimum torque value measured during the test, while MH refers to the maximum torque value attained after ML. T50 and T90 refer to the time to 50% and 90% torque, respectively, of the difference between MH and ML.

Compression set: ISO 815-1:2008, 25% compression, using type B molded buttons prepared using press cure conditions of 175° C. for 10 minutes followed by a 30 minute post cure in a hot air oven at 175° C. Time and temperature of the test conditions as specified. Data reported are the median values of 3 specimens.

Tensile properties: ASTM D412-06, die C. Samples cut from 1.5 to 2.5 mm thick test specimens press cured at 175° C. for 10 minutes and post cured 30 minutes at 175° C. in a hot air oven, followed by aging for 24 hours at ambient conditions of 23° C. and 50% relative humidity. Data reported are the median value of 3 specimens. Stress at elongations of 25%, 50%, 100%, and 200% are listed as M25, M50, M100, and M200, respectively. The rupture properties of tensile strength and elongation are indicated as Tb and Eb, (tensile at break and elongation at break, respectively). Test temperature is 23° C.±2° C.

Shore A hardness: measured using 6 mm thick samples composed of 2 mm thick plies, cured and post cured as described for tensile properties, aged for 24 hours at ambient conditions of 23° C. and 50% relative humidity, per ASTM D2240-05 test method, using a type 2 operating stand. The median value of 5 readings is reported.

Heat aging: Tensile specimens, prepared as described above are hung in a hot air oven for the specified time and temperature. The specimens are conditioned at ambient conditions of 23° C. and 50% RH for at least 24 hours before tensile properties are measured.

Inherent viscosity of polyamides: Measured in accordance with ASTM D2857-95, using 96% by weight sulfuric acid as a solvent at a test temperature of 25° C. Samples were dried for 12 hours in a vacuum oven at 80° C. prior to testing.

Melting peak temperature: Measured in accordance with ASTM D3418-08.

Example 1

Polyamide-filled EVA copolymer blends B1-B8 were prepared by mixing an EVA copolymer (A1, A2 or A3) with polyamide (P1, P2, or P3) in the ratios shown in Table 1. The polyamide-filled EVA copolymer blends were prepared as follows. The EVA copolymer and polyamide polymers were charged to a Haake Rheocord® mixing bowl equipped with roller blades, operated at a set temperature of 20° C. greater than the melting peak temperature of the polyamide and at about 30 rpm rotor speed. Once the mixing bowl was fully charged, the rotor speed was increased to 100 rpm. Polymer blend melt temperature was monitored, and when the polymer blend temperature reached the melting peak temperature of the polyamide component, a timer was started. At the same time, the set point for the bowl temperature was lowered to match the melting peak temperature of the polyamide, and air cooling of the bowl was initiated. After three minutes of mixing, the rotors were stopped, at which point the temperature of the polymer blend was in the range of 20° C. to 35° C. greater than the melting peak temperature of the polyamide. The polyamide-filled EVA copolymer blend was then removed from the bowl and cooled to room temperature (about 25° C.) before further processing.

TABLE 1

| | Blend | | | | | | | |
|---|---|---|---|---|---|---|---|---|
| | B1 % | B2 % | B3 | B4 | B5 % | B6 % | B7 % | B8 % |
| A1 | 70 | | 70 | | | | | |
| A2 | | 70 | | | 60 | 50 | 40 | 60 |
| A3 | | | | 70 | | | | |
| P1 | 30 | 30 | | 30 | 40 | 50 | 60 | |
| P2 | | | | | | | | 40 |
| P3 | | | 30 | | | | | |
| Mooney viscosity | 40 | 53 | 41 | 32 | 65 | 84 | * | * |

*not measurable

Mooney viscosity measurements for Blends B7 and B8 could not be measured, indicating that the polyamide component formed a continuous phase in the blend. Blends B1, B2, and B3, however, were further compounded by roll mill mixing at ambient temperature to produce curable compositions E1, E2, and E3 as shown in Table 2. Comparative compositions CE1 and CE2 use the same EVA copolymers and coagent, peroxide, and antioxidant, but rely on carbon black for reinforcement instead of a dispersion of polyamide.

All five curable compositions exhibit good cure response, and similar Shore A hardness, tensile properties, and compression set after press cure and post cure. After one week heat aging at 190° C., however, the comparative compositions have become hard and brittle. No meaningful tensile strength or elongation data could be obtained on testing these comparative compositions, and they exhibited an increase in Shore A hardness ranging from 18 to 21 points. Compositions E1-E3, on the other hand, exhibited elongation at break of 140 to 150%, and a slight decrease in Shore A hardness of 4 points.

TABLE 2

| | Compounds | | | | |
|---|---|---|---|---|---|
| | CE1 phr | CE2 phr | E1 phr | E2 phr | E3 phr |
| A1 | 100 | | | | |
| A2 | | 100 | | | |
| B1 | | | 142.9 | | |
| B2 | | | | 142.9 | |
| B3 | | | | | 142.9 |
| Coagent | 2 | 2 | 2 | 2 | 2 |
| Peroxide | 5 | 5 | 5 | 5 | 5 |
| Antioxidant | 1 | 1 | 1 | 1 | 1 |
| Carbon black | 30 | 30 | | | |
| Cure response | | | | | |
| ML (dN-m) | 0.3 | 0.3 | 0.3 | 0.5 | 0.4 |
| MH (dN-m) | 9.8 | 14.2 | 11.5 | 14.9 | 16.2 |
| Tensile properties and Shore A hardness after press cure 10 min/175° C. and post cure 30 minutes/175° C. | | | | | |
| Shore A | 63 | 59 | 63 | 61 | 62 |
| Tb (MPa) | 16 | 10 | 10.7 | 14.2 | 9.6 |
| Eb (%) | 170 | 190 | 160 | 230 | 140 |
| Tensile properties and Shore A hardness after press cure, post cure, and 1 week hot air aging at 190° C. | | | | | |
| Shore A | 81 | 80 | 59 | 57 | 59 |
| Tb (MPa) | * | * | 6.3 | 6.8 | 4.7 |
| Eb (%) | * | * | 150 | 140 | 95 |
| Compression set 150° C./70 hours | | | | | |
| (%) | 13 | 12 | 13 | 10 | 11 |

*too brittle to test

Example 2

The following example demonstrates the use of compatibilizers for EVA copolymer and polyamide. Polyamide-filled EVA copolymers B9-B12 were mixed in a Haake Rheocord® mixing bowl according to the method of Example 1 to produce the compositions shown in Table 3.

TABLE 3

| | Blend | | | |
|---|---|---|---|---|
| | B9 % | B10 % | B11 % | B12 % |
| A1 | 67 | 60 | 67 | 60 |
| C1 | 3 | 10 | | |
| C2 | | | 3 | 10 |
| P1 | 30 | 30 | 30 | 30 |
| Mooney Viscosity | | | | |
| | 36 | 36 | 42 | 48 |

B9-B12 were further compounded by roll mill mixing to produce curable compositions E4-E7 as shown in Table 4. All compounds in Table 4 exhibit good cure response, and further were press cured and post cured to form samples for tensile testing. In comparison to E1 (lacking compatibilizer), E4-E8 exhibit slightly improved tensile strength and elongation to break both before and after heat aging.

TABLE 4

| | Compounds | | | |
|---|---|---|---|---|
| | E4 phr | E5 phr | E6 phr | E7 phr |
| B8 | 142.9 | | | |
| B9 | | 142.9 | | |
| B10 | | | 142.9 | |
| B11 | | | | 142.9 |
| Coagent | 2 | 2 | 2 | 2 |
| Peroxide | 5 | 5 | 5 | 5 |
| Antioxidant | 1 | 1 | 1 | 1 |
| Cure Response | | | | |
| ML (dN-m) | 0.4 | 0.4 | 0.4 | 0.5 |
| MH (dN-m) | 11.8 | 11.4 | 12.4 | 13.4 |
| Tensile properties and Shore A hardness after press cure 10 min/175° C. and post cure 30 minutes/175° C. | | | | |
| Shore A | 60 | 60 | 63 | 67 |
| Tb (MPa) | 13.5 | 13.4 | 10.7 | 11.3 |
| Eb (%) | 200 | 215 | 200 | 210 |
| Tensile properties and Shore A hardness after press cure, post cure, and 1 week hot air aging at 190° C. | | | | |
| Shore A | 56 | 57 | 59 | 62 |
| Tb (MPa) | 9.1 | 9.4 | 6.6 | 6.8 |
| Eb (%) | 180 | 185 | 175 | 165 |

Example 3

The following example demonstrates the addition of conventional carbon black filler to the polyamide-filled EVA compositions. Polyamide-filled EVA copolymers B13-B15 were produced according to the method of Example 1 to form the compositions in Table 5.

TABLE 5

| | Blend | | |
|---|---|---|---|
| | B13 % | B14 % | B15 % |
| A2 | 80 | 90 | 60 |
| P1 | 20 | 10 | |
| P4 | | | 40 |
| Mooney Viscosity | | | |
| | 40 | 35 | 77 |

Blends B13-B15 were then used to produce curable compositions E8-E11 by roll mill mixing, according to the formulations shown in Table 6. E8 and E10 comprise 20 wt % polyamide based on the total amount of EVA and polyamide in the compound, and a relatively low level of conventional carbon black reinforcement (9 phr). E9 and E10 comprise less polyamide (10 wt %) and more carbon black (27 phr). Comparative examples CE4-CE6 contain 0 to 27 phr carbon black, and no polyamide.

TABLE 6

| | Compounds | | | | | | |
|---|---|---|---|---|---|---|---|
| | E8 phr | E9 phr | E10 phr | E11 phr | CE4 phr | CE5 phr | CE6 phr |
| B13 | 125 | | | | | | |
| B14 | | 111.11 | | | | | |
| B15 | | | 62.5 | 27.78 | | | |
| A2 | | | 62.5 | 83.34 | 100 | 100 | 100 |

TABLE 6-continued

| | Compounds | | | | | | |
|---|---|---|---|---|---|---|---|
| | E8 phr | E9 phr | E10 phr | E11 phr | CE4 phr | CE5 phr | CE6 phr |
| Coagent | 2 | 2 | 2 | 2 | 2 | 2 | 2 |
| Peroxide | 5 | 5 | 5 | 5 | 5 | 5 | 5 |
| Antioxidant | 1 | 1 | 1 | 1 | 1 | 1 | 1 |
| Carbon Black | 9 | 27 | 9 | 27 | | 9 | 27 |
| Polyamide content (%) based on EVA and polyamide | | | | | | | |
| | 20 | 10 | 20 | 10 | 0 | 0 | 0 |
| Cure Response | | | | | | | |
| ML (dN-m) | 0.6 | 0.4 | 0.3 | 0.3 | 0.2 | 0.2 | 0.3 |
| MH (dN-m) | 16.4 | 12.4 | 10.1 | 8.2 | 7.4 | 7.9 | 11.5 |
| Tensile properties and Shore A hardness after press cure 10 min/175° C. and post cure 30 minutes/175° C. | | | | | | | |
| Shore A | 53 | 59 | 56 | 60 | 40 | 46 | 58 |
| Tb (MPa) | 12.3 | 15.3 | 14.3 | 17.3 | 1.7 | 5.2 | 15.2 |
| Eb (%) | 205 | 205 | 180 | 220 | 200 | 240 | 245 |
| Shore A hardness increase attributable to carbon black content | | | | | | | |
| | 6 | 18 | 6 | 18 | 0 | 6 | 18 |
| Tensile properties and Shore A hardness after press cure, post cure, and 1 week hot air aging at 190° C. | | | | | | | |
| Shore A | 48 | 62 | 52 | 62 | 79 | 65 | 78 |
| Tb (MPa) | 8.3 | 8.1 | 8.3 | 8.8 | * | 5.2 | 7 |
| Eb (%) | 185 | 135 | 150 | 145 | * | 5 | 20 |

*too brittle to test

By subtracting the Shore A hardness of the unfilled compound CE4 from the Shore A hardness of CE5 or CE6, the hardness increase resulting from 9 phr carbon black is determined to be 6 points Shore A, and similarly the hardness increase for 27 phr carbon black is found to be 18 points. Therefore, compounds E8-E11 derive less than 20 points Shore A from reinforcement due to the carbon black in the compound. E8-E11 exhibit excellent resistance to hot air aging, far superior to the comparative examples CE4-CE6.

Example 4

The following example demonstrates the addition of conventional silica filler to the polyamide-filled EVA compositions. The polyamide-filled EVA copolymer composition B16 comprising 30 wt % polyamide P4 as shown in Table 7 was produced according to the method of Example 1.

TABLE 7

| | Blend B16 % |
|---|---|
| A1 | 70 |
| P4 | 30 |
| Mooney Viscosity | 39 |

B16 was then further diluted by roll mill mixing with EVA resin A1, producing blends B17-B19, in which the P4 content ranges from 20 wt % to 5 wt %. The roll mill mixing was conducted at a temperature of 40° C.

TABLE 8

| | Blend | | |
|---|---|---|---|
| | B17 phr | B18 phr | B19 phr |
| B16 | 83.33 | 37.04 | 17.54 |
| A1 | 41.67 | 74.07 | 87.72 |
| Polyamide content (%) | 20 | 10 | 5 |
| Mooney Viscosity | 29 | 23 | 21 |

Blends B16 through B19 and EVA copolymer A1 were compounded by roll mill mixing to form curable compositions E12-E14 and CE7-CE11 according to the formulations in Table 9. Curable composition E12 relies solely on polyamide for reinforcement, while E13, E14, and CE7 use increasing levels of silica and decreasing levels of polyamide to maintain relatively constant Shore A hardness after press cure and post cure. Comparative compositions CE8-CE11 comprise 0-36 phr silica filler and no polyamide, so that the hardness increase attributable to the presence of silica filler can be determined.

After heat aging one week at 190° C., compounds comprising at least 5 wt % polyamide and deriving less than 20 points Shore A hardness from silica filler exhibit greater than 100% elongation to break, whereas the compounds lacking polyamide or deriving more than 20 points Shore A hardness from silica filler exhibit elongations of 35% or less under these conditions.

TABLE 9

| | Compound | | | | | | | |
|---|---|---|---|---|---|---|---|---|
| | E12 phr | E13 phr | E14 phr | CE7 phr | CE8 phr | CE9 phr | CE10 phr | CE11 phr |
| B16 | 142.86 | | | | | | | |
| B17 | | 125 | | | | | | |
| B18 | | | 111.11 | | | | | |
| B19 | | | | 105.26 | | | | |
| A1 | | | | | 100 | 100 | 100 | 100 |
| Peroxide | 7 | 7 | 7 | 7 | 7 | 7 | 7 | 7 |
| Coagent | 2 | 2 | 2 | 2 | 2 | 2 | 2 | 2 |
| Antioxidant | 1 | 1 | 1 | 1 | 1 | 1 | 1 | 1 |
| Silica | | 12 | 24 | 36 | | 12 | 24 | 36 |
| Polyamide content (%) based on EVA and polyamide | | | | | | | | |
| | 30 | 20 | 10 | 5 | 0 | 0 | 0 | 0 |
| Cure Response | | | | | | | | |
| ML (dN-m) | 0.4 | 0.3 | 0.7 | 1.7 | 0.2 | 0.5 | 1.9 | 0.1 |
| MH (dN-m) | 14.7 | 13.7 | 17.4 | 28.2 | 9 | 14.4 | 27.8 | 6.6 |

TABLE 9-continued

| | Compound | | | | | | | |
|---|---|---|---|---|---|---|---|---|
| | E12 phr | E13 phr | E14 phr | CE7 phr | CE8 phr | CE9 phr | CE10 phr | CE11 phr |
| Tensile properties and Shore A hardness after press cure and post cure and post cure 30 minutes/175° C. | | | | | | | | |
| Shore A | 62 | 60 | 64 | 67 | 47 | 60 | 66 | 41 |
| Tb (MPa) | 10.9 | 11.1 | 12.1 | 14.7 | 2.8 | 9.4 | 14.2 | 2 |
| Eb (%) | 165 | 210 | 270 | 300 | 175 | 290 | 325 | 210 |
| Shore A hardness increase attributable to silica content | | | | | | | | |
| | | 0 | 6 | 19 | 25 | 6 | 19 | 25 | 0 |
| Tensile properties and Shore A hardness after press cure post cure, and 1 week hot air aging at 190° C. | | | | | | | | |
| Shore A | 59 | 61 | 70 | 76 | 53 | 74 | 84 | 38 |
| Tb (MPa) | 6.1 | 5.3 | 6.8 | 4.5 | 1.5 | 1.4 | 2 | * |
| Eb (%) | 120 | 115 | 105 | 35 | 15 | 5 | 10 | * |

*too brittle to test

Example 5

This example demonstrates the use of a twin screw extruder to produce a polyamide-filled EVA copolymer as shown in Table 10 with a high content of polyamide that is further processed to produce a curable compound and heat resistant article. Polyamide P1 was metered by weight loss feeder into the first barrel section of a 28 mm Berstorff® co-rotating twin screw extruder with nine barrel sections, operating at a screw speed of 150 rpm. At the same time, EVA copolymer A2 was metered into the fourth section of the extruder via a specially configured extruder. Melt temperature of the polyamide/EVA copolymer blend reached about 250° C. After exiting the die, the resultant polyamide-filled EVA copolymer was cast onto a chilled belt and cooled to 25° C. before further processing.

TABLE 10

| | Blend B20 % |
|---|---|
| A2 | 43.3 |
| P1 | 56.7 |
| Mooney viscosity | 74 |

The results in Table 10 show that even with a polyamide content of 56.7%, B20 has a Mooney viscosity of 74, and therefore could be further processed at a temperature less than the melting peak temperature of the polyamide to produce the curable compound E15 as shown in Table 11.

TABLE 11

| | Compound E15 phr |
|---|---|
| B20 | 176.37 |
| Coagent | 2 |
| Peroxide | 5 |
| Antioxidant | 1 |
| Cure Response | |
| ML (dN-m) | 1.3 |
| MH (dN-m) | 27.9 |
| Tensile properties and Shore A hardness after press cure 10 min/175° C. and post cure 30 minutes/175° C. | |

TABLE 11-continued

| | Compound E15 phr |
|---|---|
| Shore A | 80 |
| Tb (MPa) | 17.7 |
| Eb (%) | 15 |
| Tensile properties and Shore A hardness after press cure, post cure, and 1 week hot air aging at 190° C. | |
| Shore A | 59 |
| Tb (MPa) | 4.7 |
| Eb (%) | 95 |

The invention claimed is:

1. A process for production of a polyamide-filled EVA copolymer composition, the process comprising the steps
    (a) providing one or more EVA copolymers consisting essentially of EVA copolymers comprising at least 40% by weight vinyl acetate monomer, and one or more polyamides having a melting peak temperature of at least 160° C.;
    (b) mixing the one or more EVA copolymers and the one or more polyamides at a temperature above the melting peak temperatures of the one or more polyamides to disperse the one or more polyamides within the one or more EVA copolymers, the one or more EVA copolymers and one or more polyamides being present in sufficient amounts to form a polyamide-filled EVA copolymer composition comprising 5-60 wt % polyamide based on the total amount of EVA copolymers and polyamides in the blend;
    (c) cooling the polyamide-filled EVA copolymer composition to a temperature below the crystallization peak temperatures of the one or more polyamides, thereby forming a polyamide-filled EVA copolymer composition having a Mooney viscosity (ML 1+4, 100° C.) of 5 to 200, as determined according to ASTM D1646 ; and
    (d) adding a peroxide curative to the polyamide-filled EVA copolymer composition after said copolymer composition has been cooled below the crystallization peak temperatures of the one or more polyamides, the addition taking place at a temperature of less than 160° C., to form the polyamide-filled EVA copolymer composition.

2. The process of claim 1, in which the polyamide has a melting peak temperature from about 180° C. to 260° C.

3. The process of claim 1, wherein the polyamide-filled EVA copolymer composition exhibits an increase in torque of at least 2.5 dN-m, as determined in accordance with ASTM D5289-07 a using a curemeter operating at 0.5° arc and at test conditions of 177° C. for 24 minutes.

4. The process of claim 1, wherein the EVA component comprises 60 to 90 weight percent and the polyamide component comprises 10 to 40 weight percent of the sum of the EVA copolymer and polyamide components.

5. The process of claim 1, wherein the EVA component comprises 55 to 70 weight percent and the polyamide component comprises 30 to 45 weight percent of the sum of the EVA copolymer and polyamide components.

6. The process of claim 1, wherein the polyamide is selected from the group consisting of nylon 6, nylon 7, nylon 6/6, nylon 6/10, nylon 6/12, nylon 11, nylon 12, polyamides comprising aromatic monomers, and polyamide block elastomers selected from the group consisting of copoly(amide-ethers) and copoly(amide-esters).

7. The process of claim 1, wherein the polyamide has an inherent viscosity greater than 0.9 dL/g, as measured in accordance with ASTM D2857-95, using 96% by weight sulfuric acid as a solvent at a test temperature of 25° C.

8. The process of claim 1, wherein the polyamide-filled EVA copolymer composition further comprises one or more additional components selected from the group consisting of plasticizers, process aids, waxes, pigments, and colorants.

9. The process of claim 1, wherein the polyamide-filled EVA copolymer composition further comprises an antioxidant.

10. The process of claim 1, wherein the polyamide-filled EVA copolymer composition further comprises one or more additional polymers selected from the group consisting of ethylene copolymers of propylene, 1-butene, 1-hexene, 1-octene, vinyl acetate, methylacrylate, ethylacrylate, or butylacrylate; said copolymers being grafted with maleic anhydride or glycidylmethacrylate; ethylene copolymers of maleic acid, fumaric acid, or a half ester or a diester of maleic acid or fumaric acid; and ethylene (meth)acrylate elastomers, provided that the Mooney viscosity (ML 1+4, 100° C.) of the polyamide-filled EVA copolymer composition comprising the one or more additional polymers is below 200.

11. A process for preparing an EVA elastomer composition comprising the steps of
  (a) providing a polyamide-filled EVA copolymer composition that has been prepared by a process comprising the steps:
    (i) providing i) one or more EVA copolymers comprising at least 40 % by weight copolymerized vinyl acetate monomer units, and ii) one or more polyamides having a melting peak temperature of at least 160° C.;
    (ii) mixing the one or more EVA copolymers and one or more polyamides at a temperature above the melting peak temperatures of the one or more polyamides to disperse the one or more polyamides within the one or more EVA copolymers, the one or more EVA copolymers and one or more polyamides being present in sufficient amounts to form a polyamide-filled EVA copolymer composition comprising 5-60 wt % of one or more polyamides based on the total weight of EVA copolymers and polyamides in the polyamide-filled EVA copolymer composition; and
    (iii) cooling the polyamide-filled EVA copolymer composition to a temperature below the crystallization peak temperatures of the one or more polyamides, thereby forming a polyamide-filled EVA copolymer composition that has a Mooney viscosity (ML 1+4, 100° C.) of 5 to 200, as determined according to ASTM D1646;
  (b) adding a peroxide curative to the cooled polyamide-filled EVA copolymer composition at a temperature less than 160° C. to form a curable polyamide-filled EVA copolymer composition; and
  (c) curing the curable polyamide-filled EVA copolymer composition by exposing the curable polyamide-filled EVA copolymer composition to a curing temperature of 160° C. to 220° C., provided that said curing temperature is less than the melting peak temperature of the polyamide, for about 2 to 60 minutes to form an EVA elastomer composition having a Shore A hardness greater than 40, as determined according to ASTM D 2240-06, reading after 1 second.

12. The process of claim 11 in which the polyamide has a melting peak temperature from about 180° C. to 260° C.

13. The process of claim 12 in which the EVA component comprises 60 to 90 weight percent and the polyamide component comprises 10 to 40 weight percent of the sum of the EVA copolymer and polyamide components.

14. The process of claim 11, wherein the EVA component comprises 55 to 70 weight percent and the polyamide component comprises 30 to 45 weight percent of the sum of the EVA copolymer and polyamide components.

15. The process of claim 11, wherein the polyamide is selected from the group consisting of nylon 6, nylon 7, nylon 6/6, nylon 6/10, nylon 6/12, nylon 11, nylon 12, polyamides comprising aromatic monomers, and polyamide block elastomers selected from the group consisting of copoly(amide-ethers) and copoly(amide-esters).

16. The process of claim 11, wherein the polyamide has an inherent viscosity greater than 0.9 dL/g, as measured in accordance with ASTM D2857-95, using 96% by weight sulfuric acid as a solvent at a test temperature of 25° C.

17. The process of claim 11, wherein the EVA elastomer composition further comprises one or more additional components selected from the group consisting of plasticizers, process aids, waxes, pigments, and colorants.

18. The process of claim 11, wherein the EVA elastomer composition further comprises an antioxidant.

19. The process of claim 11, wherein the EVA elastomer composition further comprises one or more additional polymers selected from the group consisting of ethylene copolymers of propylene, 1-butene, 1-hexene, 1-octene, vinyl acetate, methylacrylate, ethylacrylate, or butylacrylate; said copolymers being grafted with maleic anhydride or glycidylmethacrylate; ethylene copolymers of maleic acid, fumaric acid, or a half ester or a diester of maleic acid or fumaric acid; and ethylene (meth)acrylate elastomers, provided that the Mooney viscosity (ML 1+4, 100° C.) of the polyamide-filled EVA copolymer composition comprising the one or more additional polymers is below 200.

* * * * *